US010762283B2

United States Patent
Modani et al.

(10) Patent No.: US 10,762,283 B2
(45) Date of Patent: Sep. 1, 2020

(54) MULTIMEDIA DOCUMENT SUMMARIZATION

(71) Applicant: Adobe Inc., San Jose, CA (US)

(72) Inventors: Natwar Modani, Bengaluru (IN); Vaishnavi Subramanian, Bengaluru (IN); . Utpal, Bokaro Steel (IN); Shivani Gupta, Greater Noida (IN); Pranav R. Maneriker, Pune (IN); Gaurush Hiranandani, Bengaluru (IN); Atanu R. Sinha, Boulder, CO (US)

(73) Assignee: Adobe Inc., San Jose, CA (US)

(*) Notice: Subject to any disclaimer, the term of this patent is extended or adjusted under 35 U.S.C. 154(b) by 240 days.

(21) Appl. No.: 14/947,964

(22) Filed: Nov. 20, 2015

(65) Prior Publication Data

US 2017/0147544 A1    May 25, 2017

(51) Int. Cl.
| | | |
|---|---|---|
| *G06F 17/00* | (2019.01) | |
| *G06F 40/166* | (2020.01) | |
| *G06F 16/93* | (2019.01) | |
| *G06F 16/438* | (2019.01) | |
| *G06F 16/34* | (2019.01) | |
| *G06N 5/00* | (2006.01) | |
| *G06N 5/02* | (2006.01) | |
| *G06F 40/30* | (2020.01) | |
| *G06N 3/04* | (2006.01) | |
| *G06N 3/08* | (2006.01) | |

(52) U.S. Cl.
CPC .......... *G06F 40/166* (2020.01); *G06F 16/345* (2019.01); *G06F 16/4393* (2019.01); *G06F 16/93* (2019.01); *G06F 16/94* (2019.01); *G06F 40/30* (2020.01); *G06N 5/003* (2013.01); *G06N 5/022* (2013.01); *G06N 3/0445* (2013.01); *G06N 3/0454* (2013.01); *G06N 3/088* (2013.01)

(58) Field of Classification Search
CPC .... G06F 40/166; G06F 16/4393; G06F 16/93; G06F 16/94; G06F 16/345; G06F 40/30; G06F 16/313; G06N 5/003; G06N 5/022; G06N 3/0445; G06N 3/0454; G06N 3/088
USPC ......................................................... 715/201
See application file for complete search history.

(56) References Cited

U.S. PATENT DOCUMENTS

| | | | |
|---|---|---|---|
| 10,541,000 B1 * | 1/2020 | Karakotsios | G11B 27/031 |
| 2004/0236719 A1 * | 11/2004 | Horvitz | H04L 51/12 |
| 2015/0095770 A1 * | 4/2015 | Mani | G06F 17/2745 |
| | | | 715/254 |
| 2015/0120733 A1 * | 4/2015 | Carceroni | G06F 17/30843 |
| | | | 707/737 |

(Continued)

OTHER PUBLICATIONS

Rui Yan et al., "Visualizing Timelines: Evolutionary Summarization via Iterative Reinforcement between Text and Image Streams", CIKM'12, Oct. 29-Nov. 2, 2012, Maui, HI, USA.*

(Continued)

*Primary Examiner* — Jason T Edwards
(74) *Attorney, Agent, or Firm* — SBMC

(57) ABSTRACT

Multimedia document summarization techniques are described. That is, given a document that includes text and a set of images, various implementations generate a summary by extracting relevant text segments in the document and relevant segments of images with constraints on the amount of text and number/size of images in the summary.

20 Claims, 7 Drawing Sheets

(56) References Cited

U.S. PATENT DOCUMENTS

2015/0347377 A1* 12/2015 Kim .................... G06F 17/289
 709/203
2016/0070963 A1*  3/2016 Chakraborty ...... H04N 21/8549
 386/241
2017/0068654 A1*  3/2017 Jeong ................... G06F 16/313

OTHER PUBLICATIONS

"Combined Search and Examination Report", GB Application No. 1616001.2, dated Mar. 22, 2017, 6 pages.
"Foreign Office Action", GB Application No. 161001.2, dated Jul. 10, 2019, 5 pages.
"Foreign Office Action", GB Application No. 1616001.2, dated Mar. 9, 2020, 3 pages.

* cited by examiner

MULTIMEDIA DOCUMENT SUMMARIZATION

BACKGROUND

Summarizing documents, such as articles and the like, that include multimedia content, such as text and images, typically involves providing excerpts of text and an image that is supposed to provide an encapsulation of the document. Many current approaches, however, tend to handle the summarization task with respect to only the text portion of the document. For the image portion, these approaches use the first or top full sized image as a thumbnail, without regard to the context of the image portion and how it may relate to the text portion. Thus, there really is no summarization aspect involved with respect to the images. This ignores the fact that other images or portions may be more relevant to the text portions such that collectively, the other image portions and text portions would provide better, more relevant information content.

SUMMARY

Multimedia document summarization techniques are described. That is, given a document that includes different content types, e.g., text and a set of images, various implementations generate a summary by extracting relevant text segments in the document and relevant segments of images with constraints on the amount of text and number/size of images in the summary.

In one or more implementation, a model is utilized to produce a document summary which takes into consideration different content types such as text and images. For the text and image context, the model produces a multimodal summary with high cohesion between image segments and text segments of the summary, while simultaneously maximizing the amount of information in the summary in terms of both the coverage of the document content and the diversity of information provided by the summary.

In a first approach, a given document is divided into elements. One class of elements pertains to a first content type such as text units, while another class of elements pertains to a second different content type such as image units. Gain values and costs are assigned to each of the elements. Budget constraints associated with elements are ascertained and can include the size/number of images, and number of sentences, words, or characters. Gain values are a function of the coverage that elements have regarding the information content of the document and diversity of information that the elements have with respect to the current summary. An objective function is formulated that takes into account coverage of information content, diversity of information content, and cohesion between the image and text portions of the summary. The objective function is mathematically operated upon to iteratively maximize the objective function with respect to the budget. In one implementation this is done by selecting an element to include in the summary which provides a maximum ratio of increase in the objective function to its cost. The gains for the elements may be changed after each iteration. The solution is the summary which has the approximate maximum value for the objective function within the budget constraints.

In a second approach, a graph-based approach is utilized. Specifically, a graph is created whose nodes represent different content types, e.g., text elements or image elements. Each element has a corresponding reward which is based on an inherent value of the element without considering other elements in a corresponding document. Each element has an associated cost. For example, the cost of a text element may be given in terms of the number of characters, words or sentences. The cost of each image segment may be assigned based on its size or as a unit cost. Edge weights in the graph represent the notion of the amount of information captured by an element about another element. An objective function is defined and measures the residual reward left—that is, not captured by the current summary—in the original document. The objective function is mathematically operated upon to minimize the objective function.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Figure 1:
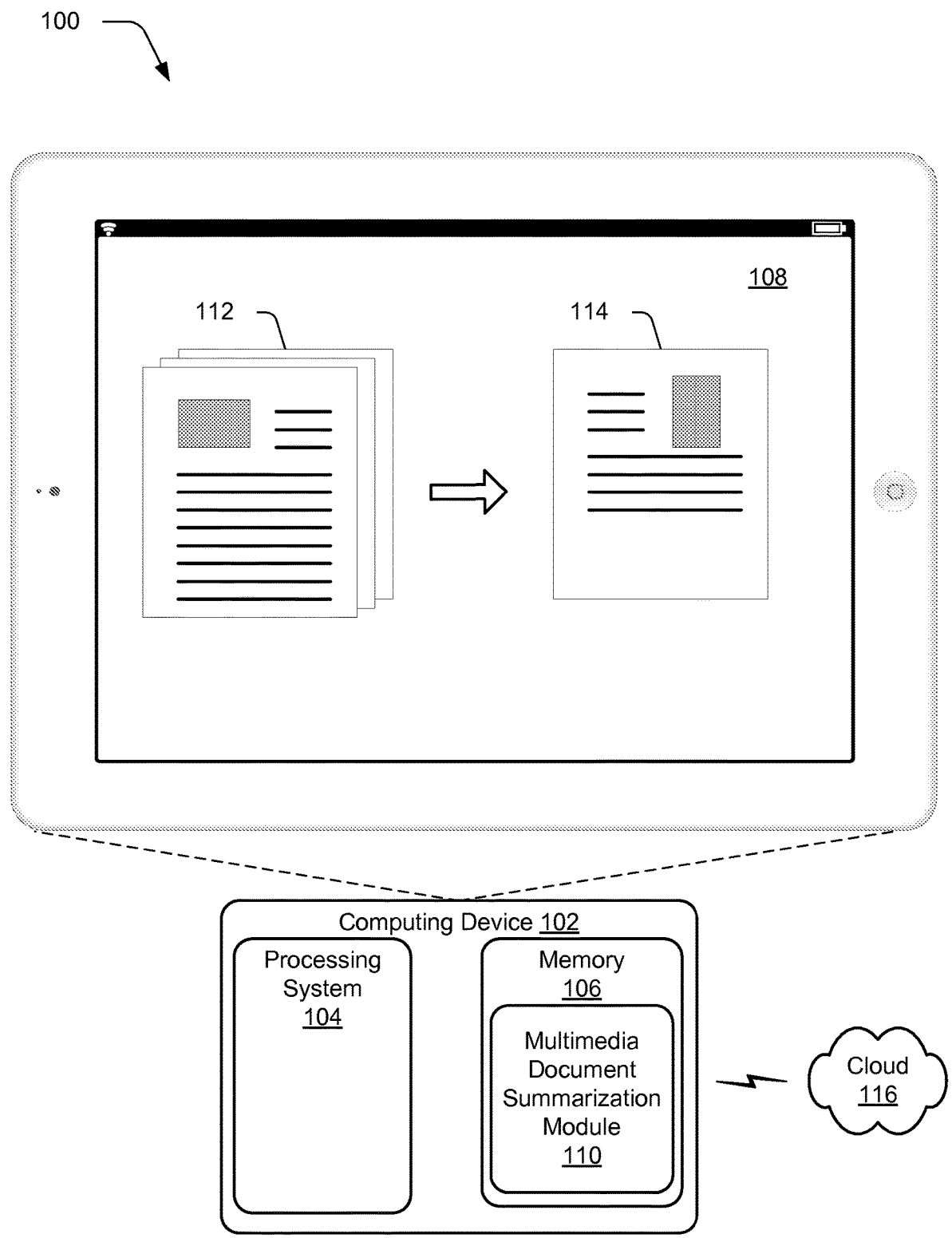
FIG. 1 is an illustration of an environment in an example implementation that is operable to employ multimedia document summarization techniques described herein.

Multimedia document summarization techniques are described. That is, given a document that includes different content types, e.g., text and a set of images, various implementations generate a summary by extracting relevant text segments in the document and relevant segments of images with constraints on the amount of text and number/size of images in the summary.

In one or more implementations, a model is utilized to produce a document summary which takes into consideration different content types such as text and images. For the text and image context, the model produces a multimodal summary with high cohesion between image segments and text segments of the summary, while simultaneously maximizing the amount of information in the summary in terms of both the coverage of the document content and the diversity of information provided by the summary.

In the context of this document, "cohesion" refers to coherence between different content types appearing in a summary, e.g., coherence between text and images that appear in a summary. "Coverage" refers to how well the different content types appearing in a summary cover the respective corresponding content types in the article. "Diversity" refers to the amount of diverse information that appears in the summary for each content type based on the corresponding content types in the article. Each of the approaches described below utilizes a so-called objective function which includes terms that take into account cohesion, coverage, and diversity relative to an article's different content types. The objective function is mathematically operated upon to produce a summary with a desirable measure of cohesion, coverage, and diversity.

In a first approach, a given document is divided into elements. One class of elements pertains to a first content type such as text units (such as sentences, sentence fragments, paragraphs, or any other suitable text units). Another class of elements pertains to a second different content type such as image units (either full images or segments of images). Gain values and costs are assigned to each of the elements—both text elements and image elements. The gain for both the image elements and text elements may be represented as a real number, which is comparable across the text and image types. The costs for the two types of elements may or may not be comparable or interchangeable. Budget constraints associated with elements are ascertained. The budget constraints can be ascertained from a user and can include such things as the size/number of images, and number of sentences, words, or characters. Gain values are a function of the coverage that elements have regarding the information content of the document and diversity of information that the elements have with respect to the current summary. By "current summary" is meant that as the described solution is an iterative one; the next iteration is dependent on the "current" state of the solution.

An objective function is formulated that takes into account coverage of information content, diversity of information content, and cohesion between the image and text portions of the summary. The objective function is mathematically operated upon to iteratively maximize the objective function with respect to the budget. In one implementation this is done by selecting an element to include in the summary which provides a maximum ratio of increase in the objective function to its cost. The gains for the elements may be changed after each iteration. Typically, the gain for an element would be decreased if an element of the same class (i.e., the text class or image class) is chosen to be included in the summary and if the two elements are related. This helps to ensure that elements from the same class which have similar information content are less likely to be in a solution, thereby increasing the diversity of the solution. The gains for elements would increase if the element chosen is from the other class, and the two elements are related. This helps to ensure that elements from different classes which have similar information content are more likely to be in the solution, thereby increasing the coherence of the solution. The solution is the summary which has the approximate maximum value for the objective function within the budget constraints.

In a second approach, a graph-based approach is utilized. Specifically, a graph is created whose nodes represent different content types, e.g., text elements or image elements. Each element has a corresponding reward which is based on an inherent value of the element without considering other elements in a corresponding document. In one approach, rewards for text elements are determined using Part of Speech (POS) tagging, as described below in more detail. Each element has an associated cost. For example, the cost of a text element may be given in terms of the number of characters, words or sentences. The cost of each image segment may be assigned based on its size or as a unit cost. Edge weights in the graph represent the notion of the amount of information captured by an element about another element. An objective function is defined and measures the residual reward left—that is, not captured by the current summary—in the original document. The objective function is mathematically operated upon to minimize the objective function to thus provide a resultant summary.

In the discussion below, the specific content types in the form of text and images are utilized as a basis to discuss the different approaches. It is to be appreciated and understood, however, that different content types other than text and images can be utilized without departing from the spirit and scope of the claimed subject matter. For example, one set of content types might pertain to the video and text.

The various approaches described above and below take into account both the text and the images in a document for summarization, and thus constitute an improvement over previous approaches that considered only text. Thus, the summaries that are created not only exhibit coverage of information and diversity of information content, but also incorporate cohesion between the images and the text that make up a summary. Summaries generated using the described techniques promote a better understanding of the associated document by looking at the apt visual image segments and the corresponding correlated text. The techniques are robust enough to perform summarization on two separate media (i.e. text and images) alone. Specifically, the techniques can be applied in the context of image-only or text-only summarization and thus, can create summaries of text documents and albums of images.

In the described approaches, one can limit the size of the summary by placing a constraint on the number of sentences, number of words, number of characters, etc. in the text part, along with constraints on the number of images, size of images, and the like, in the images part. This is referred to as a budget. Thus, a user can define how large this summary is to be.

The optimization problem is defined in such a way that it will always produce at least an image segment and at least a sentence/word/character (depending on the budget), provided the original document contains images and sentences. Irrelevant images pertaining to a document can be avoided in the multimodal summary, thus ensuring that a reader is not misled about the document through its summary. One can also modify the rewards associated with sentences and images to bias the summary towards a set of topics. For example, the interests of users can be detected and used to bias the rewards and generate personalized summaries for readers.

In the following discussion, an example digital medium environment is first described that may employ the techniques described herein. Example procedures are then described which may be performed in the example environment as well as other environments. Consequently, performance of the example procedures is not limited to the example environment and the example environment is not limited to performance of the example procedures.

Example Digital Medium Environment

FIG. 1 is an illustration of an example digital medium environment 100 in an example implementation that is operable to employ techniques usable to perform multimedia document summarization described herein. As used herein, the term "digital medium environment" refers to various computing devices and resources that can be utilized to implement the techniques described herein. The illustrated digital medium environment 100 includes a computing device 102, which may be configured in a variety of ways.

The computing device 102, for instance, may be configured as a desktop computer, a laptop computer, a mobile device (e.g., assuming a handheld configuration such as a tablet or mobile phone as illustrated), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as further described in relation to FIG. 7.

The computing device 102 includes a variety of hardware components, examples of which include a processing system 104, a computer-readable storage medium illustrated as memory 106, and a display device 108. The processing system 104 is representative of functionality to perform operations through execution of instructions stored in the memory 106. Although illustrated separately, functionality of these components may be further divided, combined (e.g., on an application specific integrated circuit), and so forth.

The computing device 102 is further illustrated as including a multimedia document summarization module 110 which, in this example, is embodied as computer readable instructions stored in memory 106 and executable by processing system 104. The multimedia document summarization module 110 is representative of functionality that can process a multimedia document 112 that includes different content types such as text and a set of images, and generate a summary 114 by extracting relevant text segments in the document and relevant segments of images with constraints on the amount of text and number/size of images in the summary 114. The multimedia document summarization module 110 enables both text and image content to be incorporated in a summary that captures relevant information and provides for both diversity and coherency of information contained in the summary, as will become apparent below. The multimedia document summarization module 110 can be implemented using any suitable approach that allows for incorporation of information coverage and diversity for both the text and image portions of a document, as well as leveraging cohesiveness as between the text portions and image portions of the document.

Figure 7:
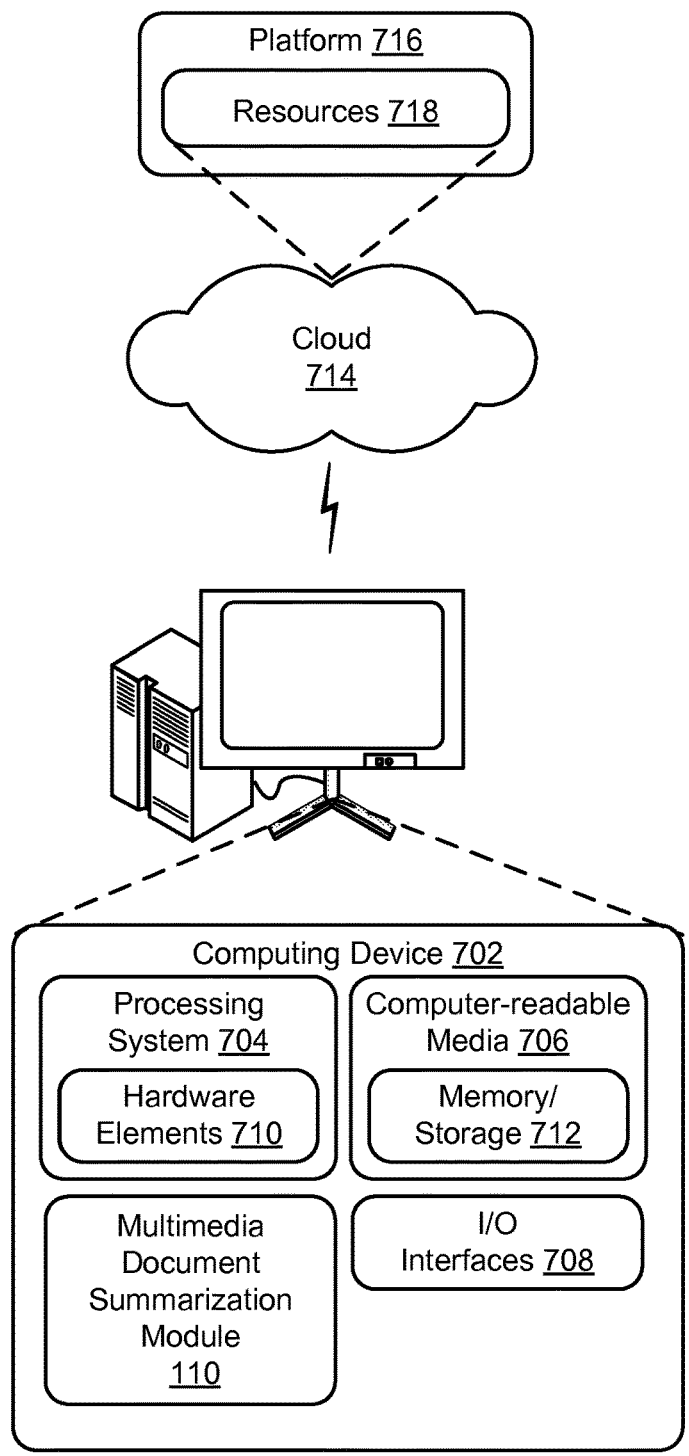
FIG. 7 illustrates an example system including various components of an example device that can be implemented as any type of computing device as described and/or utilize with reference to FIGS. 1-6 to implement the techniques described herein.

Although the multimedia document summarization module 110 is illustrated as being included locally at the computing device 102, this functionality may be divided between and/or implemented in a distributed manner or solely over the cloud 116 as further described in relation to FIG. 7.

Figure 2:
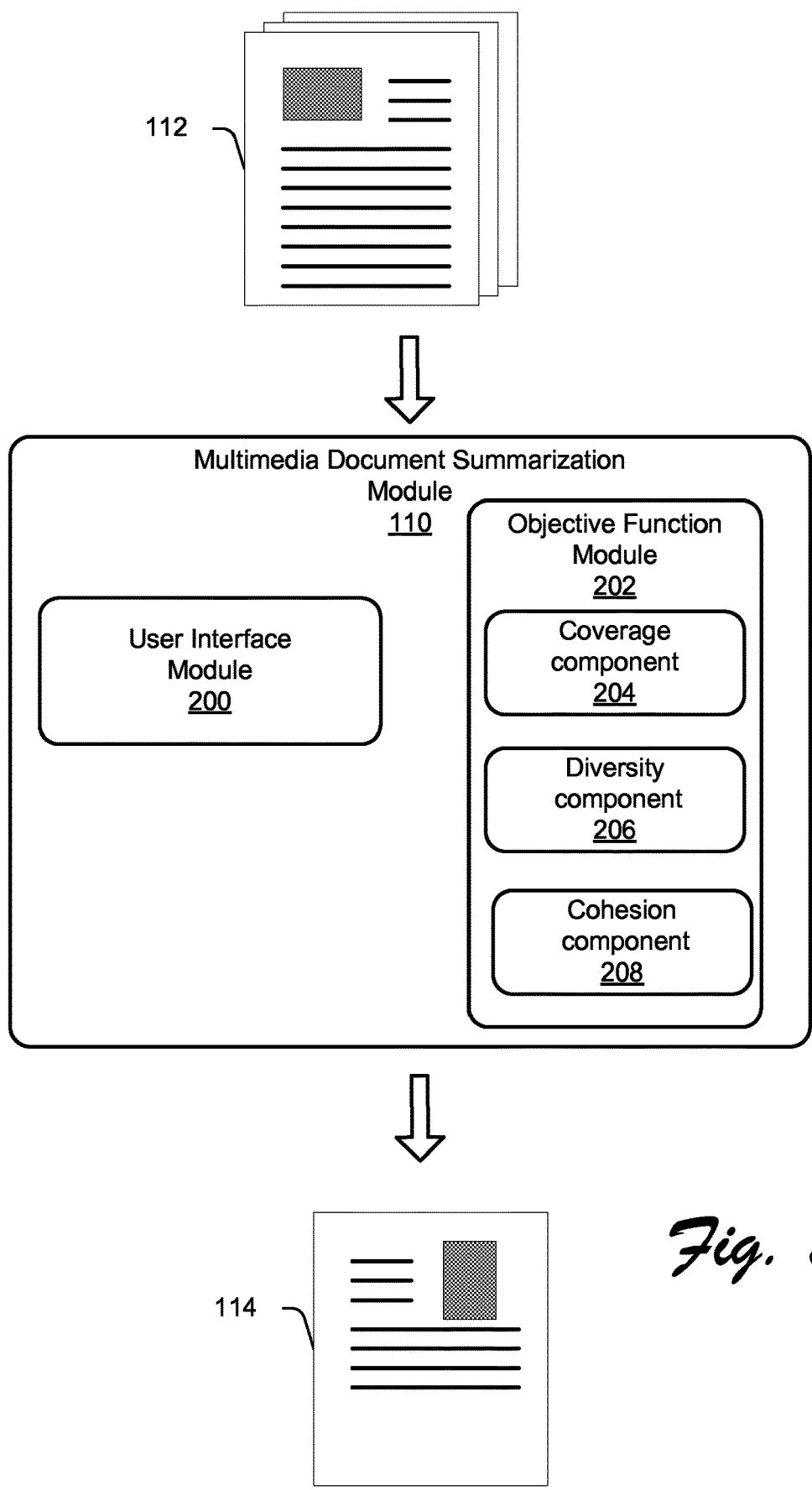
FIG. 2 depicts a system in an example implementation showing a multimedia document summarization module of FIG. 1 in greater detail.

FIG. 2 illustrates the multimedia document summarization module 110 in more detail. In this example, the multimedia document summarization module 110 includes a user interface module 200 and an objective function module 202.

The user interface module 200 enables a user to interact with the multimedia document summarization module 110. Specifically, the user interface module 200 allows a user to select one or more documents for processing and specify summary parameters, such as a set of parameters, that are to be used as a budget when processing a document. The user can specify parameters such as the number of sentences, words, or characters that a particular summary is to have. In addition, the user can specify the number and size of images that are to be contained in the summary.

The objective function module 202 is representative of functionality that processes multimedia documents 112 to provide a summary 114. In at least some implementations, the objective function module 202 is configured to perform optimization processing on multimedia documents by employing an objective function that is designed to consider coverage of text and images contained in a summary, the diversity of information contained in the summary, and the cohesion or correlation between the text and images in a particular summary. As such, the objective function module 202 uses an objective function that includes a coverage component 204, a diversity component 206 and a cohesion component 208.

The coverage component 204 provides a measure of the coverage of the text and images contained in a particular summary. The diversity component 206 provides a measure of the diversity of information contained in a particular summary. The cohesion component 208 provides a measure of the cohesion or correlation between the text and images contained in the summary. Examples of how the notions of coverage, diversity, and cohesion can be applied are described below.

Figure 3:
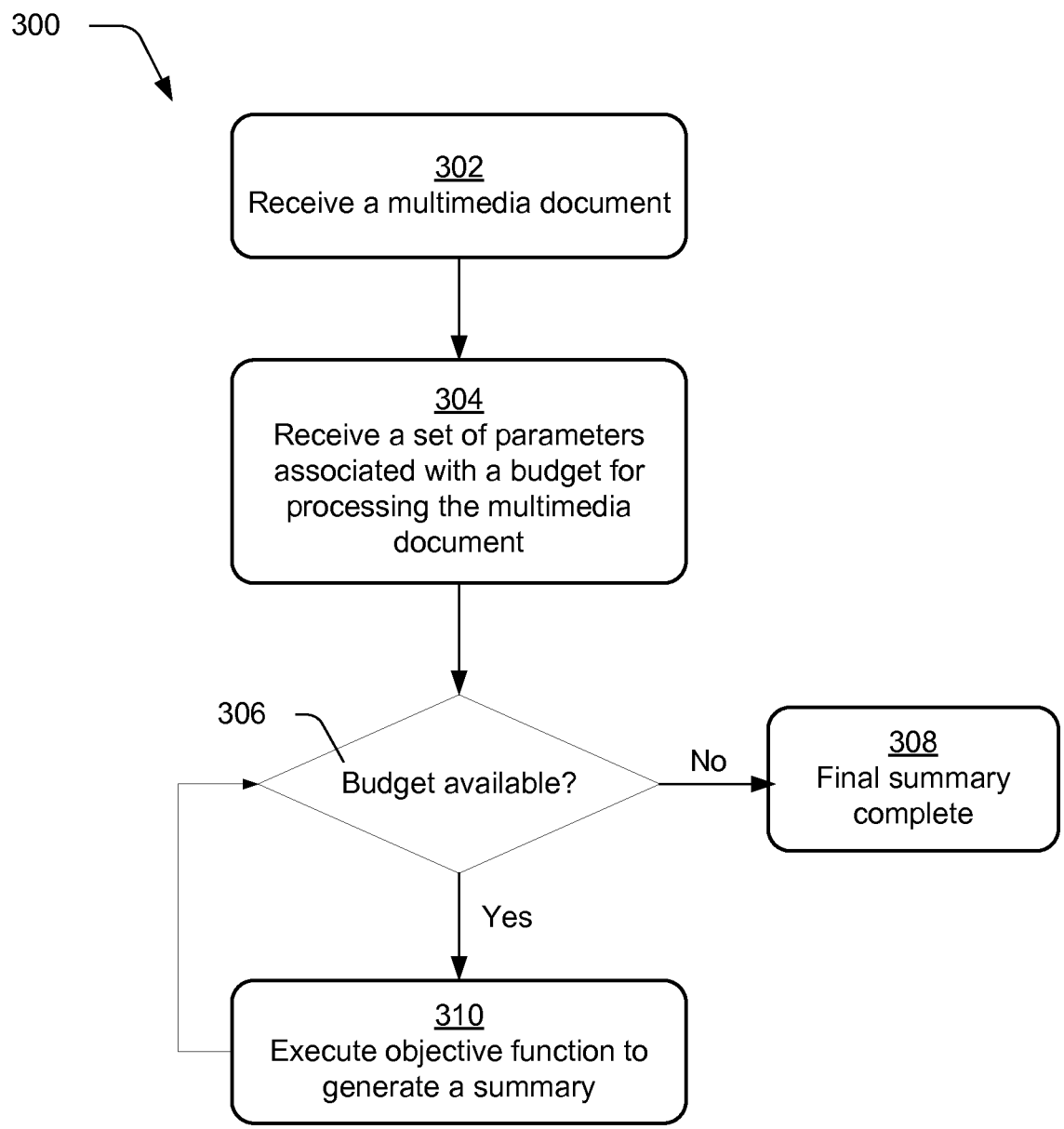
FIG. 3 is a flow diagram depicting a procedure in an example implementation in which a multimedia document is processed to provide a summary.

FIG. 3 depicts a procedure 300 for summarizing a multimedia document in accordance with one implementation. Aspects of the procedure may be implemented in hardware, firmware, or software, or a combination thereof In at least some implementations, the procedure is implemented by a suitably-configured multimedia document summarization module such as that described with respect to FIGS. 1 and 2. The procedure is shown as a set of blocks that specify operations performed by one or more devices and are not necessarily limited to the orders shown for performing the operations by the respective blocks.

A multimedia document is received for processing to generate a summary (block 302). This can be performed in any suitable way such as through the use of a suitably-configured user interface to enable the user to select a multimedia document for processing. A set of parameters associated with a budget for processing the multimedia document are received (block 304). This can be performed in any suitable way, examples of which are provided above and below. The set of parameters place a constraint on a size of the summary and define how many of a first content type and a second content type the summary may contain. For example, the set of parameters may specify that the summary is to contain 3 sentences and 1 image. The procedure next ascertains whether any budget is available for processing the multimedia document (block 306). For example, a determination can be made whether or not the constraint on the summary's size has been met. If no budget is available, the final summary is considered as complete (block 308). If, on the other hand, budget is available for processing the multimedia document, an objective function, which provides a measure of the quality of a summary, is executed to generate a summary. This can include adding elements, e.g., text and images, to the summary in a manner that moves the objective function in a desired outcome direction. Examples of how this can be performed are provided below. The procedure then returns to block 306 to attempt to iteratively improve on the summary as long as budget remains.

In the discussion below, two example approaches are described. Each approach uses a different objective function. The example approaches are intended to serve as examples and, as such, are not intended to be limiting. As such, other objective functions can be utilized without departing from the spirit and scope of the claimed subject matter.

Having considered an example system in which various implementations can be practiced, consider now a first approach for summarizing multimedia documents.

First Approach

In the discussion that follows, a brief summary of the first approach is provided, and more particularly, a brief summary of an objective function which is maximized in order to provide a quality summary. The brief summary sets out the objective function and provides various definitions of its terms. Following this, a more detailed explanation of the objective function is provided for additional context with respect to how the objective function can be employed.

First Approach—Brief Summary

The first approach utilizes an objective function that takes into account three factors: coverage, diversity, and coherence. In this example, the following objective function, which measures the quality of the summary, is maximized:

$$F(S, I) = f(C_T(S), R_T(S), C_V(I), R_V(I), COH(S,I))$$

Where

T is the text contents of the document to be summarized

V is the image contents of the document to be summarized

S is the text part of the "current" summary

I is the image part of the "current" summary

F(S,I) is the objective function whose value depends on current summaries corresponding to text and image parts f(.) is a monotonic non-decreasing function in all its variables $C_T(S)$ measures the coverage of the text part of the document by S. Summaries which cover more text information of the document will receive a higher score.

$C_V(I)$ is a similar function for the image part. It measures the coverage of the image part of the document by I. Summaries which cover more images of the document will receive a higher score.

$R_T(S)$ is the diversity reward which measures the amount of diverse information contained in S. A summary that provides more diverse information will receive a higher score.

$R_V(I)$ is a similar function for the image part. It is the diversity reward which measures the amount of diverse information contained in I.

COH (S, I) is the measure of the cohesion (correlation) between the elements of S and I. A more cohesive summary will receive a higher score.

It is to be noted that the monotonicity of the function ensures that when the value of any of its variables increases, the function value does not decreases This means that when any of the five variables improves, the value of the objective function and hence the quality of the summary increases.

With respect to budget constraints, in this particular example the following budget constraints are used:

$$\sum_{i \in S} d_i C_i \leq B_s \text{ for the text part}$$

$$\sum_{k \in I} d_k C_k \leq B_I \text{ for the image part}$$

Where, $d_i$ and $d_k$ are the decision variables for a text element and an image element respectively. It takes a value 1, if the corresponding sentence/image segment is selected in the summary, else takes value 0.

$C_i$ and $C_k$ are the cost for adding the corresponding sentence and the cost of adding the corresponding image, respectively. The cost of the text segments can be defined as the number of sentences, or number of words, or number of characters. The cost of the image segments are set to 1 per segment. Although segments of images can be of varied sizes, they are usually resized to fit in the desired image size. However, a more comprehensive cost function can be defined for the image segments.

$B_s$ and $B_I$ are the budgets corresponding to text part and image part, respectively. Notice that the budgets may be fixed separately for the image part and the text part of the summary.

To solve this optimization problem under the above constraints, a so-called iterative greedy approach is used to maximize this objective function.

Consider now a more detailed discussion of the first approach which provides further embellishment of the objective function and its use in summarizing multimedia documents.

First Approach—Detailed Discussion

In the following discussion, the following notations will be used throughout:

$r_i$: The reward of including the element i in the summary

Inf (i; j): The amount of information of element j captured by the element i $Inf_i(X)$: The amount of information of set X captured by the element i. For example, this can be defined as $$Inf_i(X) = \sum_{j \in X} Inf(i, j)$$

S: The set containing all the elements of the text part of the summary

I: The set containing all the elements of the image part of the summary

This approach incorporates the images and the cohesion of the text and image segments in the summary. In this approach, as noted above, an objective function F(S, I) which measures the quality of the summary is maximized. The objective function is as follows:

$$F(S, I) = f(C_T(S), R_T(S), C_V(I), R_V(I), COH(S,I))$$

where p0 f(.) is a monotonic non-decreasing function in all its variables, as noted above. As an example, f(.) can be a linear combination function with positive coefficients such that $$F(S, I) = C_T(S) + \alpha R_T(S) + \beta C_V(I) + \gamma R_V(I) + \delta COH(S, I)$$

where $\alpha, \beta, \gamma, \delta$ are positive constants.

$C_T(S)$ measures the coverage, or fidelity, of the text part of the document by S. Summaries which cover more text parts of the document will receive a higher score. An example of this coverage function can be $$C_T(S) = \sum_{i \in V} \min\{Inf_i(S), \alpha Inf_i(T)\}$$

where T is the entire text part of the document. For each text element i in the document, this function captures the information content of that element with respect to S, upper-bounded by a constant dependent on the document. This upper-bound is to ensure that the coverage is not boosted by the presence of many similar sentences in the summary. This is a submodular function, i.e., it satisfies the diminishing returns property. It captures the intuition that increasing the number of segments in S increases the coverage of the original document. Other definitions of coverage could also be used here without departing from the spirit and scope of the claimed subject matter.

$C_V(I)$ is a similar function for the image part and measures the coverage, or fidelity, of the image part of the document by I. Summaries which cover more parts of the image part of the document will receive a higher score. As an example, we can extend the definition above such that $$C_V(I) = \sum_{i \in V} \min\{Inf_i(I), \alpha Inf_i(V)\}$$

where V is the entire image part of the document. In this case the coverage functions are similar for the text and image parts. However, a different function can be chosen for both. In the past, image parts have not been considered in this regard.

$R_T(S)$ is the diversity reward which measures the amount of diverse information contained in S. A summary that provides more information will receive a higher score. Common methods penalize repetitiveness of information in summaries. However, in the illustrated and described implementation the diversity of the information content provided is rewarded. As an example, the text part of the document can be partitioned into clusters:

$$R_T(S) = \sum_{i \in S} \sqrt{\sum_{j \in (P_i \cap S)} r_j}$$

where $P_i$ is a partition of the ground set, i.e. the text part of the entire document, into disjoint clusters. The clusters can be obtained based on term frequency-inverse document frequency (tf-idf) distances or any other distance metric between the text segments. The square root function ensures that more benefit is given to selecting an element from a cluster that does not have any of its elements chosen. This improves the diversity of information in the text part of the final summary.

$R_V(I)$ is a similar function for the image part. This term has been introduced to incorporate diversity reward for I. Previous approaches have included no such term in the summarization models. As an example, the same definition as above can be extended to the set I to get $$R_V(I) = \sum_{i \in I} \sqrt{\sum_{j \in (P_i \cap I)} r_j}$$

where $P_i$ is a partition of the ground set, i.e. the image part of the entire document, into disjoint clusters. The clusters can be obtained based on the distances between the image segments. As an example, 4096 dimensional neural codes were obtained for each segment and a cosine distance between the vectors as the distance metric for the clustering was obtained. This improves the diversity of information in the image part of the final summary.

COH (S, I) is the measure of the cohesion between the elements of S and I. Previous approaches do not consider cohesion measures in this manner.

This term is included to incorporate cohesion such that a more cohesive summary will receive a higher score. As an example, we define $$COH(S, I) = \sum_{i \in S} \sum_{j \in I} Inf(i; j)$$

This definition takes into account the similarity of information content provided by the text segments and the image segments in the summary.

A summary which has a higher overlap between the information provided by the text and the images will get a higher cohesion value.

The objective function incorporates these factors of coverage of the document by both the text and the images, the diversity reward associated with the text and the images of the summary and the cohesion between the elements of S and I in the summary. The inclusion of these factors in the objective function enables a better summary of the document to be obtained.

The budget constraints that are utilized are described above. The budgets are fixed separately for the image part and the text part of the summary. This is because it is desirable to have a certain number of text segments and image segments in the summary. If a summary is to be generated with a different budget in mind, that can also be done by modifying the budget constraints appropriately.

The cost of including the text segments and image segments can be defined as needed. As an example, the cost of the text segments can be defined as the number of sentences, or number of words, or number of characters. The cost of the image segments are set to 1 per segment.

To implement this, a so-called iterative greedy approach is utilized to maximize the objective function. "Greedy" algorithms have been shown to be a good approximation-solution.

Figure 4:
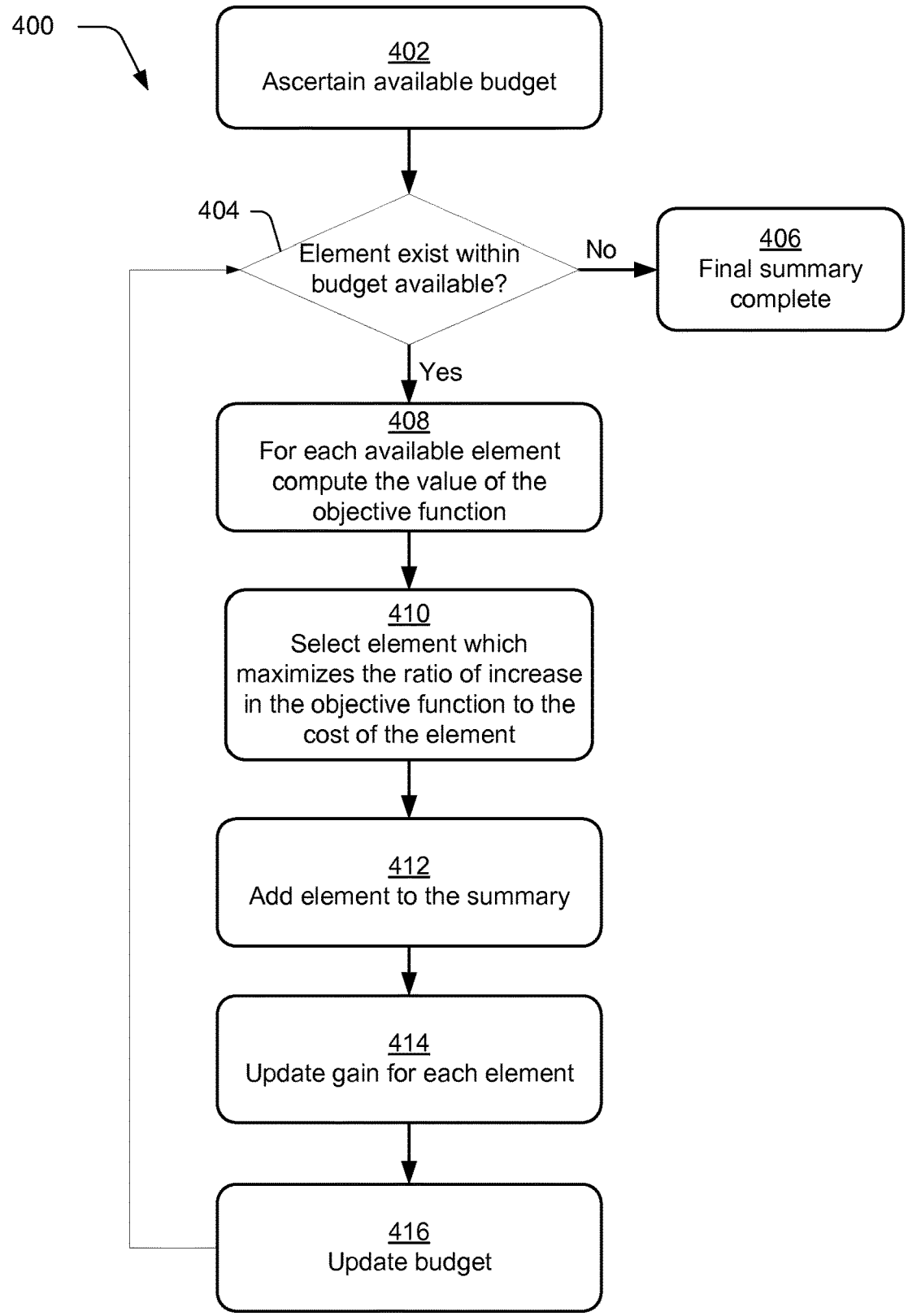
FIG. 4 is a flow diagram depicting a procedure in an example implementation in which a multimedia document is processed to provide a summary.

FIG. 4 depicts a procedure 400 in an example implementation for summarizing a multimedia document in accordance with one implementation that utilizes the above objective function. Aspects of the procedure may be implemented in hardware, firmware, or software, or a combination thereof In at least some implementations, the procedures implemented by a suitably-configured multimedia document summarization module such as that described with respect to FIGS. 1 and 2. The procedure is shown as a set of blocks that specify operations performed by one or more devices and are not necessarily limited to the orders shown for performing the operations by the respective blocks. The discussion below assumes that a multimedia document that is to undergo processing as described has been received.

An available budget for performing summarization of a multimedia document is ascertained (block 402). The budget pertains to text and image content of the summary and serves as a constraint on an amount of text content and image content that the summary may contain. This can be performed in any suitable way. For example, an available budget can be ascertained by way of input from a user through a suitably-configured user interface. The budget can allow the user to specify summary parameters including the length of the text summary and the number and size of images. Next, the procedure ascertains whether a particular element of text content or image content exists that is within the budget available (block 404) such that the constraint on the amount of text content and image content that the summary may contain has not been met. This can be performed for either the text part or the image part of the summary. If no element exists that is within the budget available, the final summary is considered as complete (block 406). If, on the other hand, a particular element exists that is within the budget available, the value of the objective function is computed for each available element in the multimedia document (block 408). That is, for each element that is available and which can be added to the summary within budget (i.e. the cost of an element is no more than the available budget for that element type), the value of the objective function is computed.

An element is then selected in the multimedia document whose computed value maximizes the ratio of increase in the objective function to the cost of the selected element (block 410). The selected element can be either an image segment or a text segment. The selected element is then added to the summary (block 412) and the gain for each element is updated (block 414). The budget is then updated (block 416) by subtracting the cost of the chosen element from the budget for the corresponding part. The procedure then returns to block 404 and iterates through the procedure until the budget is exhausted—that is, until no element is left unused having a cost lower than or equal to the available budget. At this point, the final summary can be considered as complete.

Having considered a first approach, consider now a second approach that uses a graph-based approach to provide a multimedia document summary.

Second Approach

In the discussion that follows, a brief summary of the second approach is provided, and more particularly, a brief summary of an objective function which is minimized in order to provide a quality summary. Following this, a more detailed explanation of the objective function is provided for additional context with respect to how the objective function can be employed.

Second Approach—Brief Summary

In the second approach, a graph-based approach is utilized. Specifically, a graph is created whose nodes represent text elements or image elements. Each element has a corresponding reward assigned which is based on an inherent value of the element without considering other elements in a corresponding document. In one approach, rewards for text elements are determined using Part of Speech (POS) tagging, as described below in more detail. Each element also has an associated cost. For example, the cost of a text element may be given in terms of the number of characters, words or sentences. The cost of each image segment may be assigned based on its size or as a unit cost. Edge weights in the graph represent the notion of amount of information captured by an element about another element. An objective function is defined and measures the residual reward left—that is, not captured by the current summary—in the original document. The objective function is mathematically operated upon to minimize the objective function. That is, the objective function is operated upon in a manner which seeks to minimize the residual reward.

In the illustrated and described implementation, the objective function is defined as follows:

$$G(S, I) = \sum_{j=1}^{n} r_j \prod_{i=1}^{n} (1 - d_i w_{ij}) \prod_{k=1}^{m} (1 + \hat{d}_k \hat{w}_{kj}) +$$

$$\sum_{l=1}^{m} \hat{r}_l \prod_{p=1}^{m} (1 - \hat{d}_p \tilde{w}_{pl}) \prod_{q=1}^{n} (1 + d_q \hat{w}_{ql})$$

Where,
m is the number of image segments
n is the number of text segments
S is the text part of the "current" summary
I is the image part of the "current" summary
$r_i$ represents the reward of including the $i^{th}$ text segment in the summary
$\hat{r}_k$ represents the reward of including the $k^{th}$ image segment in the summary
$d_i$ is a decision variable $\in \{0,1\}$ which informs whether the $i^{th}$ text segment is included in S
$\hat{d}_k$ is a decision variable $\in \{0,1\}$ which informs whether the $k^{th}$ image segment is included in I
$\hat{d}_p$ is a decision variable $\in \{0,1\}$ which informs whether the $p^{th}$ image segment is included in I
$d_q$ is a decision variable $\in \{0,1\}$ which informs whether the $k^{th}$ text segment is included in S
$w_{ij}$ is the amount of information of the $j^{th}$ text segment covered by the $i^{th}$ text segment i.e. weightage based on similarity.
$\hat{w}_{kj}$ is the amount of information of the $j^{th}$ text segment covered by the $k^{th}$ image segment
$\tilde{w}_{pl}$ is the amount of information of the $l^{th}$ image segment covered by the $p^{th}$ image segment
$\hat{w}_{ql}$ is the amount of information of the $l^{th}$ image segment covered by the $q^{th}$ text segment The first part of the above equation is:

$$\sum_{j=1}^{n} r_j \prod_{i=1}^{n} (1 - d_i w_{ij}) \prod_{k=1}^{m} (1 + \hat{d}_k \hat{w}_{kj})$$

This part of the equation deals with the residual rewards, i.e. the residual information present with the text part. If a text segment is selected, the residual reward associated with that segment should be zero. This is achieved by the $d_i$ factor which gets updated to 1 and $w_{ij}$ will be 1 when i=j. Thus, the term $(1-d_i w_{ij})$ will be 0 and this term will not contribute.

When a text segment which is similar (in the sense of information) is selected, the term $(1-d_i w_{ij})$ becomes small, since $w_{ij}$ is high. This ensures that the gain associated with selecting this text segment is low. This enables a more diverse set of sentences to appear in the summary. Thus, bringing out the diversity in the summary.

When a text segment which is similar (in the sense of information) is chosen, the term $(1+\hat{d}_k \hat{w}_{kj})$ increases the weight of the similar image segment. Since the objective function is being minimized, an increase in the weight of the term will enable the picking of that image segment which is highly related to the text segment, thus, bringing out the cohesion between the classes (text and images) in the summary.

Similar details hold for the second term in the context of image segments.

Now, the gain associated with the $i^{th}$ element is defined to be:

$$Gain_i = \sum_{j=1}^{n} w_{ij} r_j + \sum_{k=1}^{m} \hat{w}_{ik} \hat{r}_k$$

The budget constraints are same as used in the first approach above.

Given the information above, an iterative greedy approach is used to minimize the objective function G, as it is a measure of residual reward.

Having considered a brief summary of the second approach, consider now a detailed discussion that includes an illustrative example.

Second Approach—Detailed Discussion

As noted above, the second approach is a graph-based approach which seeks to minimize an objective function which measures the residual reward left in the original document. Recall that the objective function is defined as follows:

$$G(S, I) = \sum_{j=1}^{n} r_j \prod_{i=1}^{n} (1 - d_i w_{ij}) \prod_{k=1}^{m} (1 + \hat{d}_k \hat{w}_{kj}) +$$

$$\sum_{l=1}^{m} \hat{r}_l \prod_{p=1}^{m} (1 - \hat{d}_p \tilde{w}_{pl}) \prod_{q=1}^{n} (1 + d_q \hat{w}_{ql})$$

Looking at this equation in more detail, the first part of the equation $$\sum_{j=1}^{n} r_j \prod_{i=1}^{n} (1 - d_i w_{ij}) \prod_{k=1}^{m} (1 + \hat{d}_k \hat{w}_{kj})$$

pertains to the residual rewards associated with the text part of the document. The second part of the equation $$\sum_{l=1}^{m} \hat{r}_l \prod_{p=1}^{m} (1 - \hat{d}_p \tilde{w}_{pl}) \prod_{q=1}^{n} (1 + d_q \hat{w}_{ql})$$

pertains to the residual rewards associated with the image part of the document.

If a text segment is selected, the residual reward associated with that segment should be zero. This is achieved by the $d_i$ factor which gets updated to 1 and $w_{ij}$ will be 1 when i=j. Thus, the term $(1-d_i w_{ij})$ will be 0 and this term will not contribute.

When a text segment which is similar (in the sense of information) is selected, the term $(1-d_i w_{ij})$ becomes small, since $w_{ij}$ is high. This factor has a multiplicative effect on the reward of the text element. This ensures that the gain associated with selecting this text segment is low. This enables a more diverse set of sentences to appear in the summary, thus bringing out the diversity in the summary.

When an image segment which is similar (in the sense of information) is chosen, the term $(1+\hat{d}_k \hat{w}_{kj})$ is greater than 1. This multiplicative factor increases the reward of the similar text segment. Since the objective function is being minimized, an increase in the term will enable selection of that text segment which is related to the image segment. This brings about the cohesion in the summary. Similar details hold for the second term in the context of image segments.

To implement this, as noted above, an iterative greedy approach is used to minimize the objective function. For this we first define the gain associated with the element to be, as described above, $$Gain_i = \sum_{j=1}^{n} w_{ij} r_j + \sum_{k=1}^{m} \hat{w}_{ik} \hat{r}_k.$$

Figure 5:
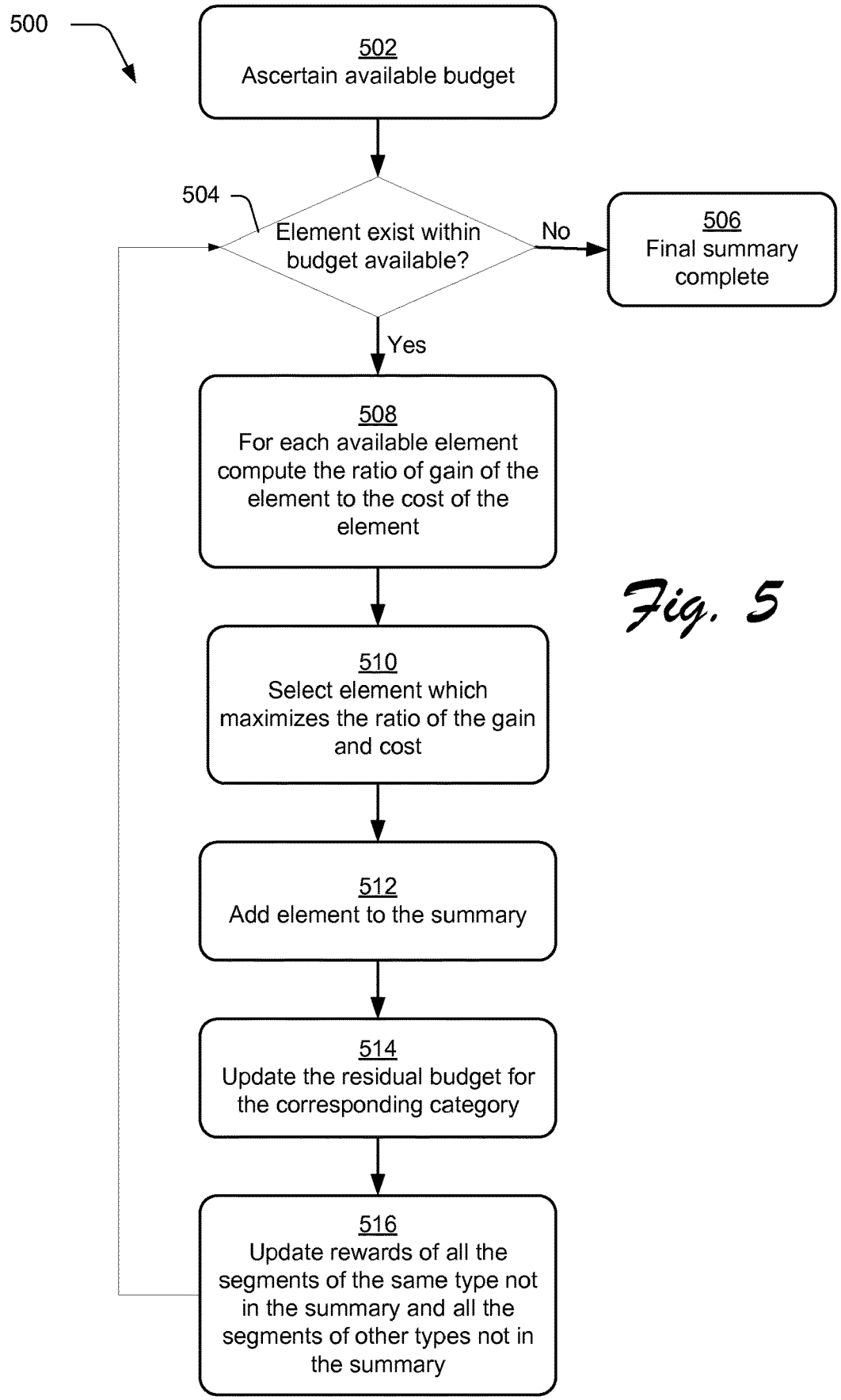
FIG. 5 is a flow diagram depicting a procedure in an example implementation in which a multimedia document is processed to provide a summary.

FIG. 5 depicts a procedure 500 in an example implementation for summarizing a multimedia document in accordance with the second approach. Aspects of the procedure may be implemented in hardware, firmware, or software, or a combination thereof. In at least some implementations, the procedures implemented by a suitably-configured multimedia document summarization module such as that described with respect to FIGS. 1 and 2. The procedure is shown as a set of blocks that specify operations performed by one or more devices and are not necessarily limited to the orders shown for performing the operations by the respective blocks. The discussion below assumes that a multimedia document that is to undergo processing as described has been received.

An available budget for performing summarization of a multimedia document is ascertained (block 502). This can be performed in any suitable way. For example, an available budget can be ascertained by way of input from a user through a suitably-configured user interface. The budget can allow the user to specify summary parameters including the length of the text summary and the number and size of images. Next, the procedure ascertains whether an element exists that is within the budget available (block 504). This can be performed for either the text part or the image part of the summary. If no element exists that is within the budget available, the final summary is considered as complete (block 506). If, on the other hand, an element exists that is within the budget available, for each available element that can be added, the ratio of gain of the element to the cost of the element is computed (block 508).

An element is then selected (either an image segment or a text segment) which provides the maximum ratio of the gain and cost of block 508 (block 510). The selected element is then added to the summary (block 512) and the residual budget for the corresponding category is updated (block 514).

The rewards of all the segments of the same type not in the summary are updated, as are the rewards of all segments of other types that are not in the summary (block 516). For example, in one implementation, the rewards of all the elements of the same type that are not in the summary are updated as follows:

$$R_j = (1 - w_{kj}) R_j$$

Similarly, the rewards of all the segments of other types not in the summary are updated as follows:

$$R_j = (1+w_{kj})R_j$$

The procedure then iterates by looping back to block 504 until the budget is exhausted and the final summary is complete.

This procedure is designed to maximize the term (Original reward—Residual reward), where the original reward is the sum of the rewards of all the segments and the residual reward is as defined above and is sought to be minimized. This graph-based approach tries to ensure maximum cross cohesion between segments of the different types (text and images) while also ensuring diversity of content and coverage of information overall. Consider now a discussion that describes various implementation aspects of this approach including how values are obtained for the various terms utilized in this approach.

Implementation Details

Consider first the term $r_i$ which pertains to the reward of including the $i^{th}$ text segment in the summary. To reward the text segments, Part of Speech (POS) Tagging of sentences is used. The text segments which contain important parts of speech such as nouns, verbs, adjectives, and adverbs are given 1 unit value, while prepositions and conjunctions are ignored. Other approaches can give different values to the different POS elements, including negative values. Other methods of rewarding text segments, such as those based on tf-idf can also be used.

Consider the term $\hat{r}_j$ which pertains to the reward of including the $j^{th}$ image segment in the summary. To reward the image elements, a determination is made as to how different the segment is. In one approach, this can be done by clustering the 4096 dimensional neural codes as described in Girshick, Ross, et al. "Rich feature hierarchies for accurate object detection and semantic segmentation." *Computer Vision and Pattern Recognition (CVPR)*, 2014 *IEEE Conference on.* IEEE, 2014. Other methods can, of course, be used.

Consider the term $w_{ij}$ which pertains to the amount of information of the $j^{th}$ text segment covered by the $i^{th}$ text segment. In the illustrated and described implementations, continuous vector representations were used to obtain semantically-aware representations of sentences as a basis for measuring the amount of information captured. The vector representations generated use the concept of recursive auto encoder (RAE) as described in Socher, Richard, et at. "Dynamic pooling and unfolding recursive autoencoders for paraphrase detection." *Advances in Neural Information Processing Systems.* 2011. Unsupervised RAEs are based on an unfolding Objective and learn feature vectors for phrases in syntactic trees. The unfolding recursive auto encoder for a sentence has the shape of the parse tree with the tree inverted. The unfolding auto encoder essentially tries to encode each hidden layer such that it best reconstructs its entire subtree to the leaf nodes.

The vector representation of the root of the parse tree is then taken to be the representative vector of the sentence generated using a trained matrix. These vectors can then be used for computing the cosine similarity between two sentences so as to understand how much two sentences are semantically correlated.

This similarity is used as the measure of information captured of one sentence by the other. This measure is a symmetric one. It is also possible to use other measures, such as using a bag-of-words model as will be appreciated by the skilled artisan. It is also possible to use directed information measures.

Consider the term $\hat{w}_{ql}$ which pertains to the amount of information of the $l^{th}$ image segment covered by the $q^{th}$ text segment. To obtain this measure, vectors are extracted from sentences and images. Any suitable process can be utilized for extracting vectors, an example of which is described in Karpathy, Andrej, Armand Joulin, and Fei Fei F. Li. "Deep fragment embeddings for bidirectional image sentence mapping." *Advances in neural information processing systems,* 2014. The process involves first segmenting out parts of images that are likely to be objects, and then running an RCNN to extract 4096-dimensional vectors corresponding to each of these segments. The network is identical to the one used in Girshick, Ross, et al. "Rich feature hierarchies for accurate object detection and semantic segmentation." *Computer Vision and Pattern Recognition (CVPR)*, 2014 *IEEE Conference on.* IEEE, 2014. In operation, the segments calculated by this process are used and intersections are taken between any two, so that more relevant segments of the images also appear as candidates. The top 20 out of these segments are selected based on the likelihood of each of the segments being an object. The objects are restricted to ten objects per class to avoid over-representation of any class (e.g., of the top 20 segments picked up of an image, 13 may belong to the 'background' class. However, we do not want the image segments to only have background in them. Thus, an upper bound of ten objects per class is selected). After this step, a non-maximal suppression is performed so that the segments input to the summarization are not redundant, but diverse. We then add the "whole image" to the set of segments.

In the illustrated and described implementation, the sentence vectors are constructed by getting the typed dependencies from sentences and using vectors corresponding to each of these dependencies for a sentence to generate a vector for the sentence. We then multiply both the RCNN vector (for image segments) by a matrix and also the sentence vector by a matrix to project them into a common vector space. These matrices have been trained on an image dataset such that the description of an image is likely to be close to the image in the common space as described in Karpathy, Andrej, Armand Joulin, and Fei Fei F. Li, "Deep fragment embeddings for bidirectional image sentence mapping." *Advances in neural it ornration processing systems* 2014. The cosine similarity between these vectors is then computed. We define this measure to be the amount of information captured by the text segment of the image segment, and also for the information captured by the image segment of the text segment, i.e. our measure is symmetric. This need not, however, be the case. That is, other definitions of the measure can also be used without departing from the spirit and scope of the claimed subject matter.

Consider the term $\tilde{w}_{pl}$ which pertains to the amount of information of the $l^{th}$ image segment covered by the $p^{th}$ image segment. Here, we take the common space vectors extracted for the image in the previous step and we compute the cosine similarity between these vectors. The reason for using common space projection instead of the RCNN vectors directly is that the 4096-dimensional vector may have extra features corresponding to color, brightness and related features of the image; however, we are only concerned with the semantics and concepts that are present in images. This measure is also symmetric. Other definitions of the metric can also be used without departing from the spirit and scope of the claimed subject matter.

Having considered a detailed discussion of the second approach, consider now an example which illustrates application of the second approach.

Second Approach Example

To understand this approach, consider a basic example in which a summary of 2 sentences and 1 image segment is constructed out of a document containing 3 sentences and 1 image segment. In this example, the cost of a sentence is considered to be 1 unit and the cost of an image segment is considered to be 1 unit.

Figure 6:
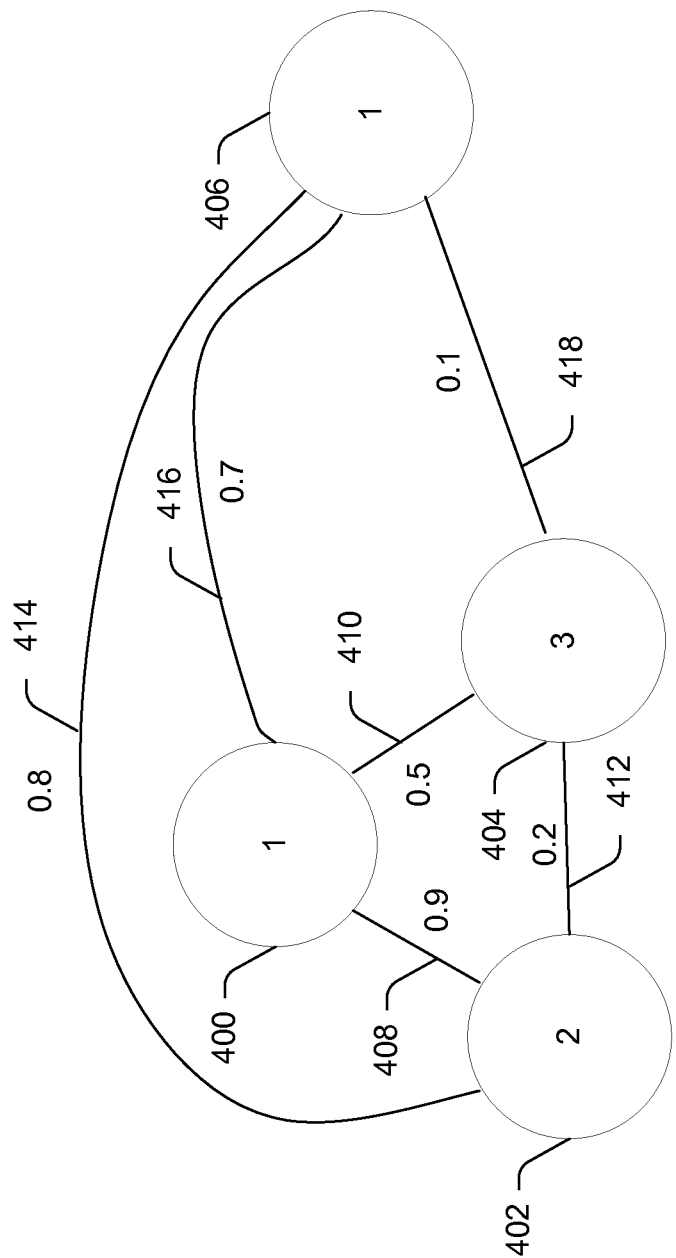
FIG. 6 illustrates an example graph-based approach in which nodes represent text elements and image elements.

Consider FIG. 6 which illustrates an initial graph with 3 text segments and 1 image segment as nodes and consider the information captured by the segments to be symmetric. The text segments are represented by nodes 400, 402, and 404, and the image segment by node 406. The same-element similarity is associated with edges 408, 410, and 412 and the similarity between segments of a different type is associated with edges 414, 416, and 418. Self-weights are taken to be 1. Consider now the rewards associated with the segments as:

Sentence 1: 50
Sentence 2: 35
Sentence 3: 75
Image Segment 1: 70

Also, assume that the budget available is 2 sentences and 1 image segment. In the first iteration, nothing is present in the summary. Thus, budget is available. The gains associated with all of the segments is defined as follows:

$$Gain_i = \sum_{j=1}^{n} w_{ij} r_j + \sum_{k=1}^{m} \hat{w}_{ik} \hat{r}_k,$$

and when computed for the above sentences and image segments yields the following values:

Sentence 1:=1.0*50+0.9*35+0.5*75+0.7*70=168.0

Sentence 2:=0.9*50+1.0*35+0.2*75+0.8*70=151.0

Sentence 3:=0.5*50+0.2*35+1.0*75+0.1*70=114.0

Image Segment 1:=0.7*50+0.8*35+0.1*75+
1.0*70=140.5

These values are the same as $$\frac{Gain_i}{C_i}$$

since the associated costs are 1. Here, Sentence 1 maximizes the gain, thus sentence 1 is included in the summary and the rewards of all the sentences are updated as $$R_j = (1-w_{kj})R_j$$

to yield the following values:

Sentence 1:=(1−1)*50=0

Sentence 2:=(1−0.9)*35=3.5

Sentence 3:=(1−0.5)*75=37.5

From this, observe that sentence 2, which is very similar to sentence 1 in the context of information, now presents a lower reward. This is to provide diversity in the content in the summary. The reward of the image segment is updated as $$R_j = (1+w_{kj})R_j$$

to yield the following value:

Image Segment 1:=(1+0.7)*70=119

From this, observe that the image segment 1, which is very similar to sentence 1 in the context of information, now presents a higher reward. This is to provide cohesion between the text and the image part of the summary.

Continuing, notice that there is budget available for 1 sentence and 1 image. The process thus proceeds to find the next element as described above. Specifically, the gains for the remaining sentences and image segment are computed as follows:

Sentence 2:=0.9*0+1.0*3.5+0.2*37.5+0.8*119=106.2

Sentence 3:=0.5*0+0.2*3.5+1.0*37.5+0.1*119=50.1

Image Segment 1:=0.7*0+0.8*3.5+0.1*37.5+
1.0*119=125.55

Notice that the image segment maximizes the gain. Accordingly, the image segment is included in the summary and the rewards of all the sentences are updated as $$R_j = (1+w_{kj})R_j$$

This is because an image has been included and sentences are of the text type. Computing the rewards yields the following:

Sentence 1:=(1+0.7)*0=0

Sentence 2:=(1+0.8)*3.5=6.3

Sentence 3:=(1+0.1)*37.5=41.25

We update the rewards of the image segment as $R_j=(1-w_{kj})R_j$ to get:

Image Segment 1:=(1−1)*119=0

Notice that there is still budget available for one sentence. Accordingly, the process proceeds to find the next element as before.

Sentence 2:=0.9*0+1.0*6.3+0.2*41.25+0.8*0=14.55

Sentence 3:=0.5*0+0.2*6.3+1.0*41.25+0.1*0=42.51

Here, Sentence 3 maximizes the gain, and thus is included in the summary.

The rewards of all the sentences are updated as $$R_j = (1-w_{kj})R_j$$

to yield:

Sentence 1:=(1−5)*0=0

Sentence 2:=(1−0.2)*6.3=5.04

Sentence 3:=(1−1)*41.25=0

The reward of the image segment is updated as $$R_j = (1+w_{kj})R_j$$

to yield:

Image Segment 1:=(1+0.1)*0=0

Since no more budget is available, the summary is output as sentences 1, 3 and the image segment 1. By maximizing the gain at each step, the residual reward left in the document has been minimized.

Having considered various implementations above, consider now a discussion of an example system and device that can implement the implementations described above.

Example System and Device

FIG. 7 illustrates an example system generally at 700 that includes an example computing device 702 that is representative of one or more computing systems and/or devices that may implement the various techniques described herein. This is illustrated through inclusion of the multimedia document summarization module 110. The computing device 702 may be, for example, a server of a service provider, a device associated with a client (e.g., a client device), an on-chip system, and/or any other suitable computing device or computing system.

The example computing device 702 as illustrated includes a processing system 704, one or more computer-readable media 706, and one or more I/O interface 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware elements 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 706 is illustrated as including memory/storage 712. The memory/storage 712 represents memory/storage capacity associated with one or more computer-readable media. The memory/storage component 712 may include volatile media (such as random access memory (RAM)) and/or nonvolatile media (such as read only memory (ROM), Flash memory, optical disks, magnetic disks, and so forth). The memory/storage component 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 710 and computer-readable media 706 are representative of modules, programmable device logic and/or fixed device logic implemented in a hardware form that may be employed in some implementations to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of a module that is executable by the computing device 702 as software may be achieved at least partially in hardware, e.g., through use of computer-readable storage media and/or hardware elements 710 of the processing system 704. The instructions and/or functions may be executable/operable by one or more articles of manufacture (for example, one or more computing devices 702 and/or processing systems 704) to implement techniques, modules, and examples described herein.

The techniques described herein may be supported by various configurations of the computing device 702 and are not limited to the specific examples of the techniques described herein. This functionality may also be implemented all or in part through use of a distributed system, such as over a "cloud" 714 via a platform 716 as described below.

The cloud 714 includes and/or is representative of a platform 716 for resources 718. The platform 716 abstracts underlying functionality of hardware (e.g., servers) and software resources of the cloud 714. The resources 718 may include applications and/or data that can be utilized while computer processing is executed on servers that are remote from the computing device 702. Resources 718 can also include services provided over the Internet and/or through a subscriber network, such as a cellular or Wi-Fi network.

The platform 716 may abstract resources and functions to connect the computing device 702 with other computing devices. The platform 716 may also serve to abstract scaling of resources to provide a corresponding level of scale to encountered demand for the resources 718 that are implemented via the platform 716. Accordingly, in an interconnected device implementation, the functionality described herein may be distributed throughout the system 700. For example, the functionality may be implemented in part on the computing device 702 as well as via the platform 716 that abstracts the functionality of the cloud 714.

CONCLUSION

Multimedia document summarization techniques are described. That is, given a document that includes text and a set of images, various implementations generate a summary by extracting relevant text segments in the document and relevant segments of images with constraints on the amount of text and number/size of images in the summary.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment including one or more computing devices configured to perform document summarization, a method comprising:
   receiving a multimedia document to be processed to generate a summary;
   receiving a set of parameters associated with a budget for processing the multimedia document, the set of parameters associated with the budget placing a constraint on a size of the summary and defining how many of a first content type and a second content type the summary is permitted to contain, wherein the first content type and the second content type are two different content types;
   responsive to a determination of the constraint on the size of the summary specified by the budget having not been met, generating the summary for the multimedia document by:
      determining that individual elements of the first content type and the second content type in the multimedia document are available within the budget to be added to the summary;
      executing an objective function for each available element that can be added to the summary within the budget, the objective function providing a measure of a contribution of each available element to coverage of information content relative to content of the multimedia document, diversity of information content relative to content of the multimedia document, and cohesion of information content relative to content of the summary;
      selecting an available element which maximizes a ratio of increase in the objective function to a cost of the element, wherein the cost of the element is a measure of the size of the element; and
      adding the selected element to the summary.

2. The method as described in claim 1, wherein receiving the set of parameters comprises receiving user-specified parameters.

3. The method as described in claim 1, wherein receiving the set of parameters comprises receiving parameters associated with the first content type and the second content type.

4. The method as described in claim 1, wherein the first content type comprises text and the second content type comprises images, and wherein receiving the set of parameters comprises receiving one or more of: number of sentences the summary is to have or number of images the summary is to have.

5. The method as described in claim 1, wherein executing the objective function comprises iteratively executing the objective function to provide the summary.

6. The method as described in claim 1, further comprising after receiving the multimedia document, assigning gain values and cost to each available element of the first content type and the second content type in the multimedia document, wherein the gain values are a function of the coverage that elements have regarding the information content of the document and diversity of information that the elements have with respect to the summary, and a higher gain value of an element results in a higher ratio of increase in the objective function to a cost of the element.

7. The method as described in claim 6, further comprising:
updating gains of elements not in the summary;
updating a residual budget for corresponding element categories; and
iterating through, until the budget is exhausted: said executing an objective function for each available element; said selecting an available element which maximizes a ratio of increase; said adding the selected element to the summary; said updating gains of elements not in the summary; and said updating a residual budget.

8. In a digital medium environment including one or more computing devices to perform document summarization, a method comprising:
receiving a multimedia document to be processed to generate a summary;
ascertaining whether a budget is available for processing the multimedia document, the budget placing a constraint on the size of the summary and serving as a constraint on an amount of text content and image content that the summary is permitted to contain;
ascertaining whether a particular element of text content or image content in the multimedia document exists within the budget available such that the constraint on the amount of text content and image content that the summary is permitted to contain has not been met;
responsive to the particular element existing within the budget available, computing a value of an objective function for each available element in the multimedia document within the budget, the objective function providing a measure of a contribution of the particular element to coverage of information content relative to content of the multimedia document, diversity of information content relative to content of the multimedia document, and cohesion of information content relative to content of the summary, and being configured to compute a value for at least one text element and at least one image element in the multimedia document;
responsive to said computing, selecting an element in the multimedia document whose computed value maximizes a ratio of increase in the objective function to a cost associated with the selected element in the multimedia document wherein the cost of the element is a measure of the size of the element; and
adding the selected element to the summary.

9. The method as described in claim 8, further comprising:
after adding the selected element to the summary,
updating a gain for each element in the multimedia document;
updating the budget;
ascertaining whether any budget is available for processing the multimedia document;
responsive to an element existing within the budget available iterating through said computing the value, said selecting an element, said adding the selected element, said updating a gain, said updating the budget and said ascertaining whether any budget is available until no element in the multimedia document is left unused having at least a cost lower than the available budget.

10. The method as described in claim 9, wherein the objective function includes a term that measures coverage of image parts of the document.

11. The method as described in claim 9, wherein the objective function includes a term that measures coverage of text parts of the document and a term that measures coverage of image parts of the document.

12. The method as described in claim 9, wherein the objective function includes a term that provides a diversity reward which measures the amount of diverse information provided in the summary for both text parts and image parts.

13. The method as described in claim 9, wherein the objective function includes:
a term that measures coverage of text parts of the document;
a term that measures coverage of image parts of the document; and
a term that provides a diversity reward which measures the amount of diverse information provided in the summary for both text parts and image parts.

14. In a digital medium environment having one or more computing devices to perform document summarization, a system comprising:
a processor;
a computer-readable storage media storing computer-readable instructions which, when executed by the processor, perform operations comprising:
receiving a multimedia document to be processed to generate a summary;
ascertaining whether a budget is available for processing the multimedia document, the budget placing a constraint on the size of the summary and serving as a constraint on an amount of text content and image content that the summary is permitted to contain;
processing the multimedia document by:
ascertaining whether a particular element of text content or image content in the multimedia document exists within the budget available such that the constraint on the amount of text content and image content that the summary may contain has not been met;
responsive to the particular element existing within the budget, for each available element in the multimedia document that can be added to the summary, computing a ratio of gain of the available element to cost of the available element, wherein gain is a function of coverage that available elements have regarding information content of the multimedia document and diversity of information that available elements have with respect to a current summary, and wherein the cost of the element is a measure of the size of the element;
selecting an available element in the multimedia document which provides a maximum ratio of gain to cost; and
adding the selected element to the summary.

15. The system as described in claim 14, wherein said processing is configured to minimize an objective function that measures a residual reward not captured by a current summary.

16. The system as described in claim 14, wherein said processing is configured to consider diversity of content in the summary.

17. The system as described in claim 14, wherein said processing is configured to enable selection of text content related to image content in the summary.

18. The system as described in claim 14, wherein executing the computer-readable instructions performs operations further comprising assigning rewards to individual text elements and image elements of the multimedia document, the rewards being based on a value of a respective text element or image element, wherein a higher reward value of an element results in a higher ratio of gain to cost of the element.

19. The system as described in claim 18, further comprising:

after adding the selected element to the summary, updating a residual budget for corresponding element categories;

updating rewards of elements not in the summary;

ascertaining whether a particular element of text content or image content in the multimedia document exists within the budget available such that the constraint on the amount of text content and image content that the summary is permitted to contain has not been met;

responsive to the particular element existing within the budget, for each available element in the multimedia document that can be added to the summary, iterating through said computing the ratio, said selecting an available element, said adding the selected element, said updating the residual budget, and said updating rewards until the budget is exhausted.

20. The system as described in claim 19, wherein assigning rewards to individual text elements and image elements includes a cohesion component that is based on similarity of information between elements not in the summary and elements of different content type already in the summary such that elements not in the summary that have a higher similarity of information with elements of different content type already in the summary will have a higher reward value than elements not in the summary that have a lower similarity of information with elements of different content type already in the summary.

\* \* \* \* \*